(12) United States Patent
Dickinson et al.

(10) Patent No.: US 9,353,890 B2
(45) Date of Patent: May 31, 2016

(54) MAGNETIC CABLE FASTENER

(71) Applicant: Termax Corporation, Lake Zurich, IL (US)

(72) Inventors: Daniel James Dickinson, Lincolnshire, IL (US); Michael Walter Smith, Palatine, IL (US); John Winnie, Lake Zurich, IL (US); Michael Tirrell, Volo, IL (US); John Clasen, Crystal Lake, IL (US)

(73) Assignee: TERMAX CORPORATION, Lake Zurich, IL (US)

( * ) Notice: Subject to any disclaimer, the term of this patent is extended or adjusted under 35 U.S.C. 154(b) by 0 days.

(21) Appl. No.: 14/462,555

(22) Filed: Aug. 18, 2014

(65) Prior Publication Data

US 2016/0047493 A1 Feb. 18, 2016

Related U.S. Application Data

(63) Continuation-in-part of application No. 13/831,525, filed on Mar. 14, 2013, which is a continuation-in-part of application No. 12/464,867, filed on May 13, 2009, now Pat. No. 8,615,852, application No. 14/462,555, which is a continuation-in-part of application No. 14/462,538, filed on Aug. 18, 2014.

(51) Int. Cl.
| | |
|---|---|
| *F16L 3/08* | (2006.01) |
| *F16M 13/02* | (2006.01) |
| *F16B 1/00* | (2006.01) |
| *F16L 3/13* | (2006.01) |
| *F16L 3/12* | (2006.01) |

(52) U.S. Cl.
CPC ... *F16L 3/08* (2013.01); *F16B 1/00* (2013.01); *F16L 3/1222* (2013.01); *F16L 3/13* (2013.01); *F16M 13/022* (2013.01); *F16B 2001/0035* (2013.01)

(58) Field of Classification Search
CPC .. A47G 1/17; F16B 2001/0035; F16M 13/00; F16M 13/02; F16L 3/04; F16L 3/06; F16L 3/00; F16L 3/08; F16L 3/1222
See application file for complete search history.

(56) References Cited

U.S. PATENT DOCUMENTS

| | | | | |
|---|---|---|---|---|
| 3,464,660 A | * | 9/1969 | Neale, Sr. | F16L 3/12 24/23 R |
| 3,825,214 A | * | 7/1974 | Ciolfi | B62J 11/00 248/300 |
| 3,900,021 A | * | 8/1975 | Makepeace | A16B 1/04 403/DIG. 1 |
| 4,455,011 A | * | 6/1984 | Levine | F16M 7/00 152/504 |
| 4,895,473 A | * | 1/1990 | Hennick | A47B 57/26 248/188 |
| 5,354,952 A | * | 10/1994 | Hickey | H02G 3/263 174/503 |

(Continued)

*Primary Examiner* — Ryan Kwiecinski
*Assistant Examiner* — Alp Akbasli

(57) ABSTRACT

A pole bracket magnetically attaches a magnetic cable fastener to a magnetic object such as a building structure such as a frame, electrical box, conduit, truss, I-beam, car body, vehicle chassis or any suitable object. For example, the pole bracket removably attaches to and holds the magnetic cable fastener to hold a cable to the building structure. The pole bracket has a base having a pole attachment portion to attach to a pole. The pole bracket also has a magnetic clip holder section coupled to the base. The magnetic clip holder section includes a snap stem portion operable to removably hold the magnetic cable fastener. As the magnetic fastener is positioned as desired via the pole bracket, the magnetic fastener is magnetically self-aligned with and removably attached to the building structure.

8 Claims, 10 Drawing Sheets

(56) References Cited

U.S. PATENT DOCUMENTS

| | | | | |
|---|---|---|---|---|
| 5,681,019 | A * | 10/1997 | Boyce | A01K 9/00 248/103 |
| 6,003,824 | A * | 12/1999 | Peterson | A47G 7/044 248/312.1 |
| 6,073,899 | A * | 6/2000 | Omrani | A47K 10/185 248/311.2 |
| 6,257,537 | B1 * | 7/2001 | Williams | A01M 29/32 248/213.1 |
| 6,517,032 | B1 * | 2/2003 | Gretz | F16L 3/23 248/62 |
| 6,629,809 | B2 * | 10/2003 | Vassiliou | F16B 37/041 411/173 |
| 7,185,796 | B2 * | 3/2007 | Parsons | A45F 5/02 224/197 |
| 7,331,567 | B2 * | 2/2008 | Li | F16B 7/14 248/354.6 |
| 7,422,188 | B1 * | 9/2008 | Schlosser | A45B 1/04 224/407 |
| 7,435,031 | B2 * | 10/2008 | Granata | B60R 13/0206 403/329 |
| 8,328,147 | B2 * | 12/2012 | Gardner | F41A 23/06 124/86 |
| 8,403,430 | B2 * | 3/2013 | Atkins | A47F 10/06 248/122.1 |
| D691,879 | S * | 10/2013 | Bernard | D8/382 |
| 8,544,392 | B2 * | 10/2013 | Fields | A47B 91/16 108/146 |
| 8,596,601 | B1 * | 12/2013 | Andersen | F16M 13/02 211/96 |
| 9,097,270 | B2 * | 8/2015 | Fitz Roman | F16B 2/22 |
| 2006/0138293 | A1 * | 6/2006 | Clement | F21S 4/001 248/206.5 |
| 2011/0001025 | A1 * | 1/2011 | Fiedler | A45C 13/1069 248/206.5 |
| 2011/0049315 | A1 * | 3/2011 | Buckbee | A01K 97/00 248/219.4 |
| 2011/0140474 | A1 * | 6/2011 | Smith | B60R 13/0206 296/35.1 |
| 2013/0043368 | A1 * | 2/2013 | Hill | E04H 17/1421 248/534 |
| 2013/0182381 | A1 * | 7/2013 | Gray | F16M 13/02 361/679.01 |
| 2013/0299653 | A1 * | 11/2013 | Emmons, Sr. | F16M 13/02 248/205.3 |
| 2014/0191106 | A1 * | 7/2014 | Le Gette | F16M 13/02 248/688 |
| 2014/0262881 | A1 * | 9/2014 | Colby | A61B 19/0288 206/363 |
| 2014/0306071 | A1 * | 10/2014 | Stechmann | H02G 3/32 248/74.1 |

* cited by examiner

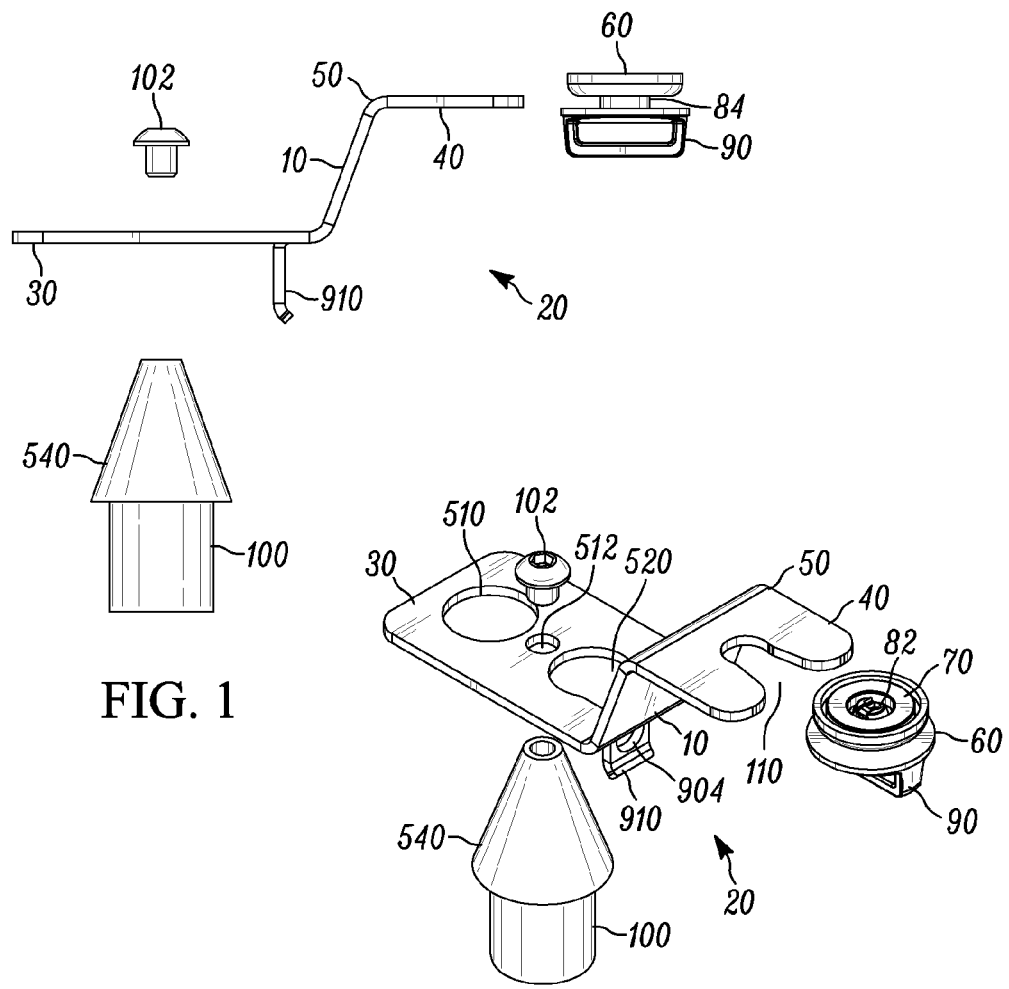
FIG. 1
FIG. 2
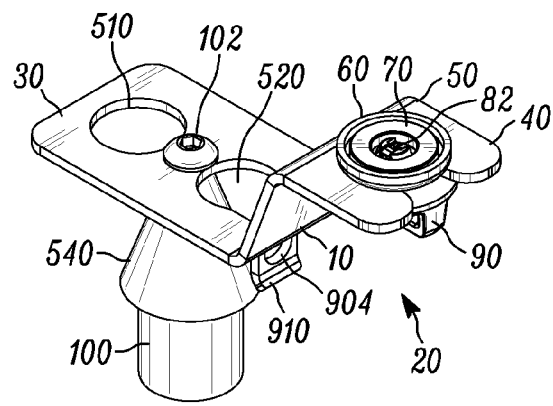
FIG. 3

MAGNETIC CABLE FASTENER

RELATED APPLICATIONS

This is a continuation in part application claiming priority from an application entitled "Magnetic Bracket and Method" having a docket number P055D and a Ser. No. 13/831,525, and having a filing date of Mar. 14, 2013, the entire disclosure of which is incorporated herein by reference.

Which is a continuation in part application claiming priority from an application entitled "Magnetic Fastener Clip" having a docket number P055 and a Ser. No. 12/464,867, and having a filing date of May 13, 2009, now U.S. Pat. No. 8,615,852 the entire disclosure of which is incorporated herein by reference.

Co-Pending patent application entitled "Magnetic Cable Fastener" having a docket number P055B and Ser. No. 14/462,538 having a filing date Aug. 18, 2014 as this patent application the entire disclosure of which is incorporated herein by reference.

FIELD OF THE INVENTION

The invention relates generally to devices for fastening objects, and more particularly to a pole bracket and/or magnetic fastener to secure cables or to attach onto an engagement structure, such as a building frame, a hollow substrate, a wall, a plate, vehicle chassis or any suitable surface.

BACKGROUND OF THE INVENTION

A number of devices and fasteners are currently available for fastening, brackets and cables to a building frame, truss, I-beam or vehicle chassis. Typically an electrician drills a hole into an iron or steel frame of a building structure and attaches a cable or electrical conduit via the hole in the building structure. For example, an electrician bundles a wiring harness or cable and attaches the cable with a cable tie.

Fastener clips are used in automobile assemblies to secure cables and body panels such as headliners, pillar covers, interior panels and the like to roofs, door structures and body pillars. An example of such a clip is described in U.S. Pat. Nos. 8,615,852 and 8,627,552 both incorporated by reference.

Fasteners, such as brackets or screws, are also known to retain a cable to a building or vehicle chassis. For example, a screw may attach a cable in position within the building structure or vehicle chassis.

These known fasteners require fastening with a screw driver or wrench and thus are cumbersome and difficult to install especially in a high ceiling. Nor are they installed without a screw driver or wrench for example on an electrical box, conduit or automobile environments that can be somewhat harsh. If the cable bracket, screw or clip is loosened or broken after installation, the cable may fall or sag again presenting an aesthetically undesirable appearance. Further, replacement of an installed, broken cable bracket, screw or clip can again be difficult.

BRIEF DESCRIPTION OF THE DRAWINGS

FIG. 1 is an exploded view of a pole bracket and assembly according to one embodiment;
FIG. 2 is a perspective view of the pole bracket and assembly according to one embodiment;
FIG. 3 is an assembly view of the pole bracket assembled according to one embodiment.

DETAILED DESCRIPTION OF THE PREFERRED EMBODIMENTS

Figure 4:
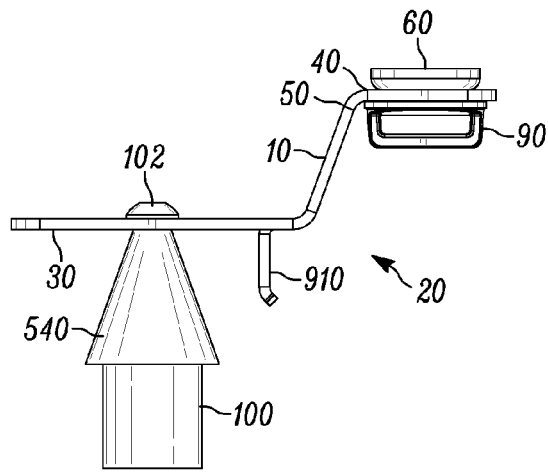
FIG. 4 is a side view of the pole bracket assembled according to one embodiment.
Figure 5:
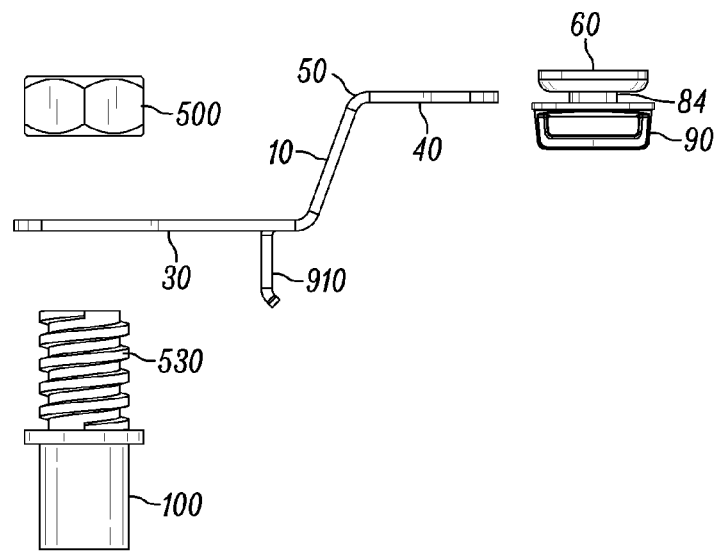
FIG. 5 is an exploded view of a pole bracket and assembly according to another embodiment.
Figure 6:
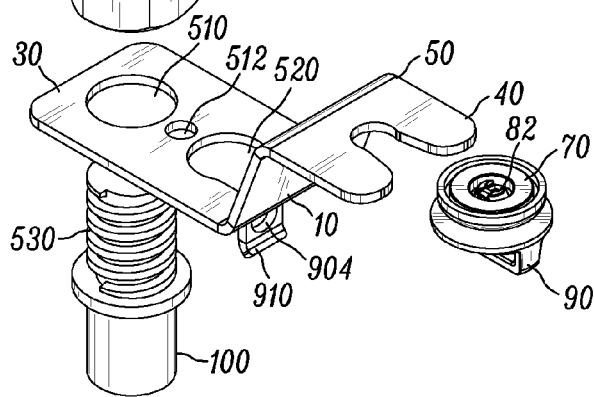
FIG. 6 is a perspective view of the pole bracket and assembly according to one embodiment.
Figure 7:
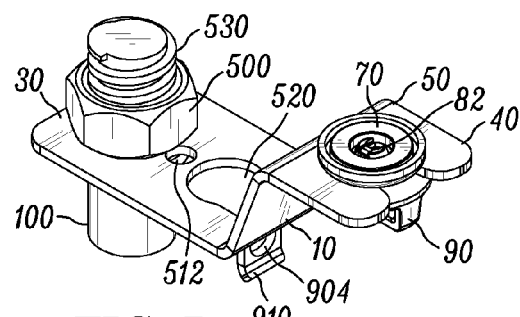
FIG. 7 is an assembly view of the pole bracket assembly according to one embodiment.
Figure 8:
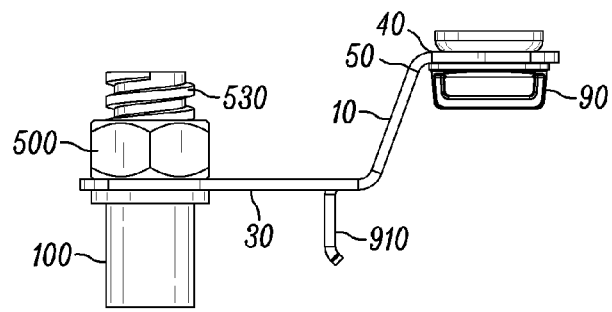
FIG. 8 is a side view of the pole bracket assembled according to one embodiment.
Figure 9:
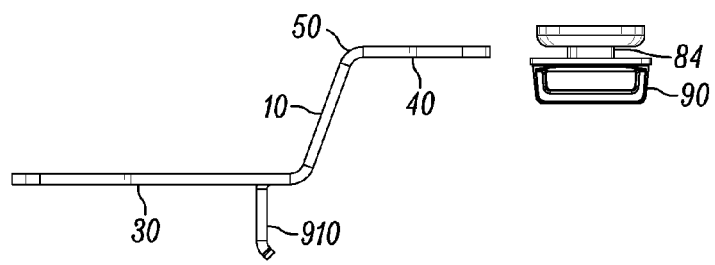
FIG. 9 is an exploded view of a pole bracket and assembly according to another embodiment.
Figure 9:
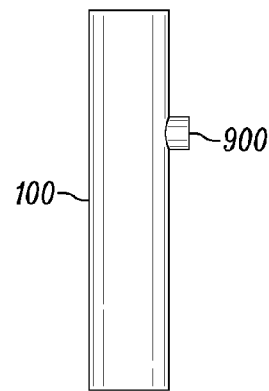
Figure 10:
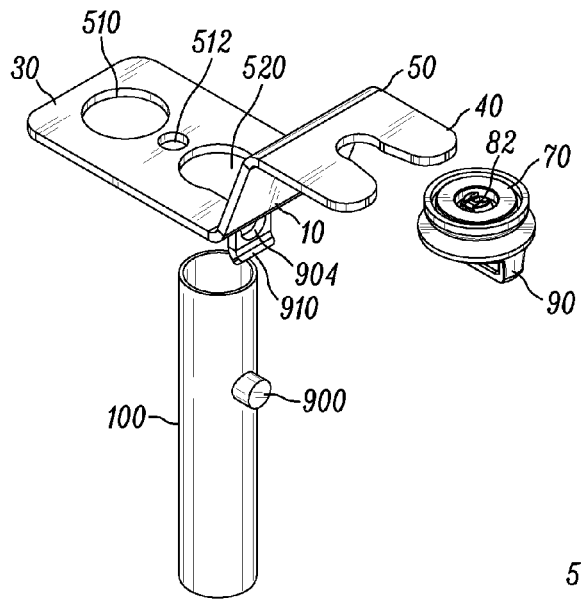
FIG. 10 is a perspective view of the pole bracket and assembly according to one embodiment.
Figure 11:
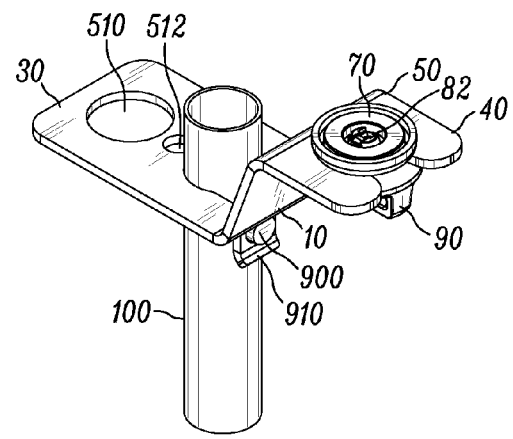
FIG. 11 is an assembly view of the pole bracket assembled according to one embodiment.
Figure 12:
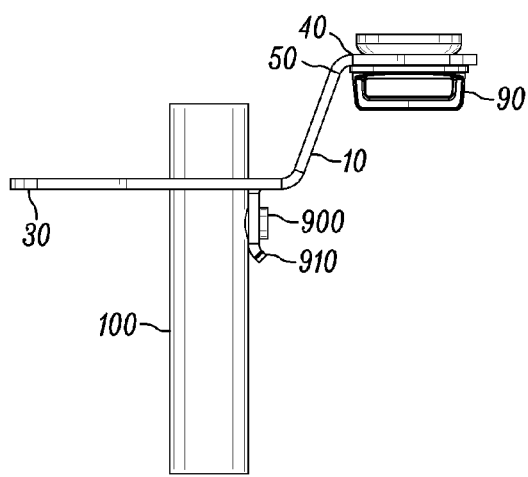
FIG. 12 is a side view of the pole bracket assembled according to one embodiment.
Figure 13:
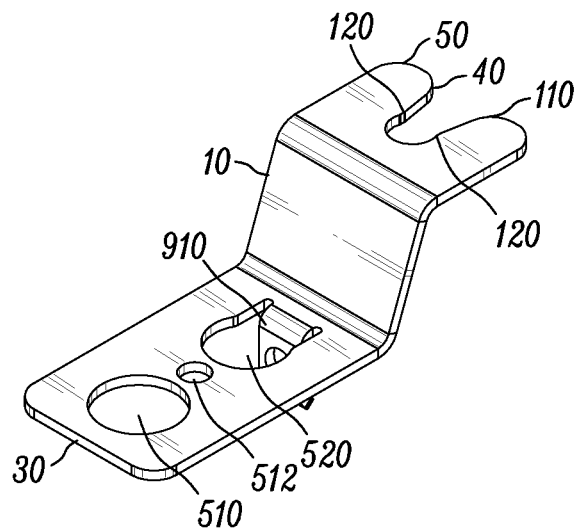
FIG. 13 is a top perspective view of the pole bracket according to one embodiment.
Figure 14:
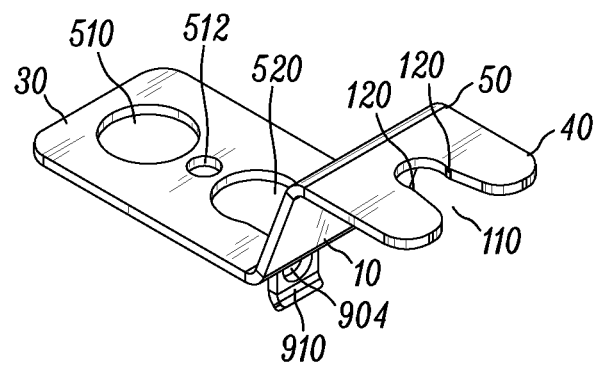
FIG. 14 is another top perspective view of the pole bracket according to one embodiment.
Figure 15:
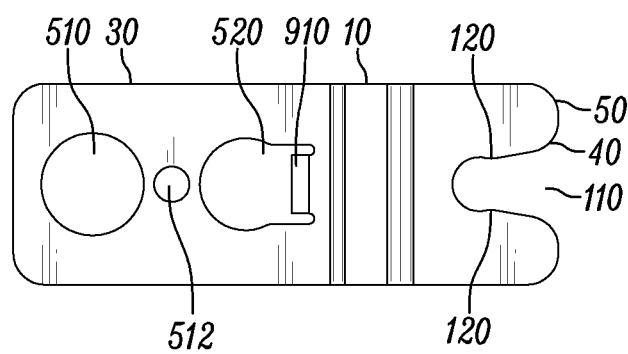
FIG. 15 is top view of the pole bracket according to one embodiment.
Figure 16:
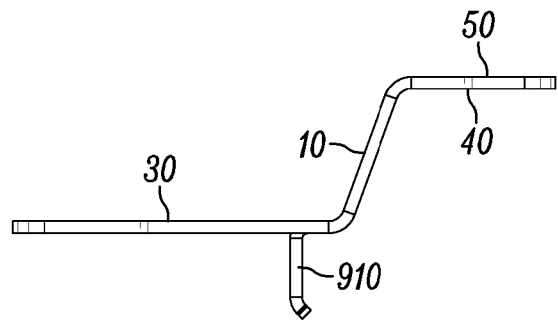
FIG. 16 is a side view of the pole bracket according to one embodiment.
Figure 17:
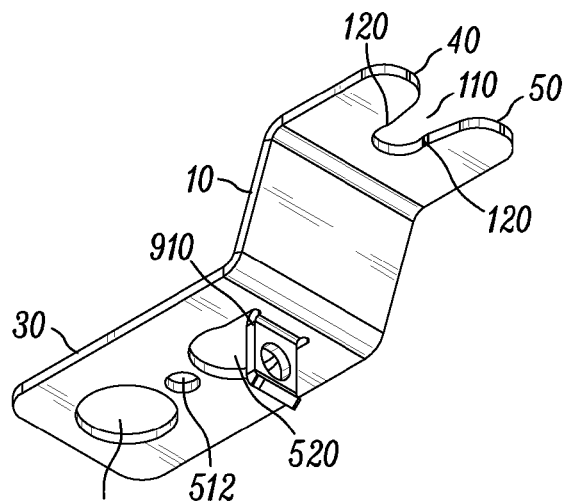
FIG. 17 is a bottom perspective view of the pole bracket according to one embodiment.
Figure 18:
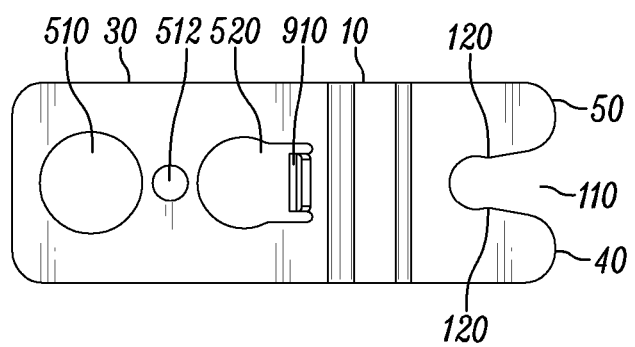
FIG. 18 is top view of the pole bracket according to one embodiment.
Figure 19:
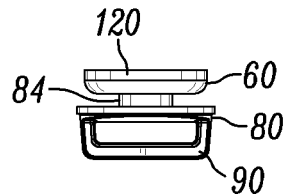
FIGS. 19 to 22 are various views of the magnetic cable fastener according to one embodiment.
Figure 20:
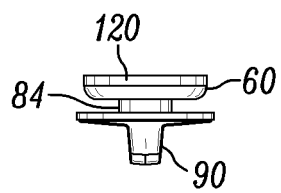
Figure 21:
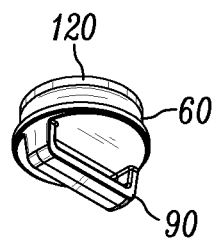
Figure 22:
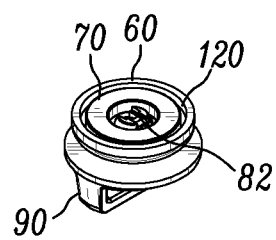
Figure 23:
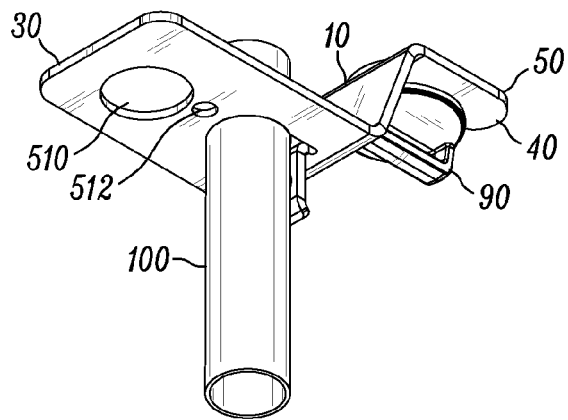
FIGS. 23 to 25 are various views of a pole bracket and assembly with a magnetic cable fastener according to another embodiment.
Figure 24:
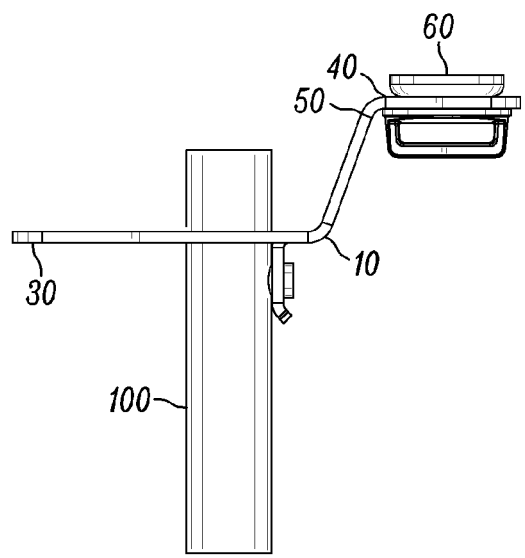
Figure 25:
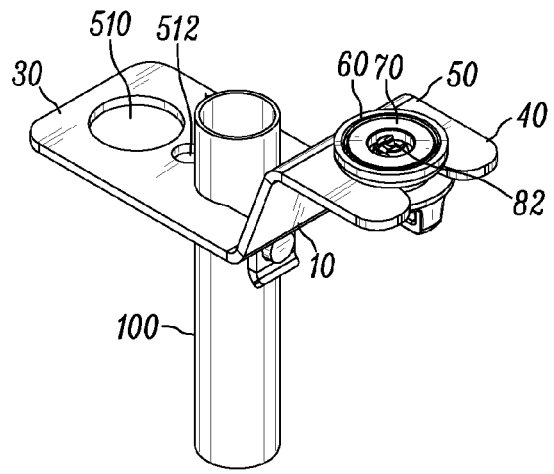

A pole bracket magnetically attaches a magnetic cable fastener to a magnetic object such as a building structure, a frame, electrical box, conduit, truss, I-beam, car body, vehicle chassis or any suitable object. For example, the pole bracket removably attaches to and holds the magnetic cable fastener to hold a cable to the building structure. The pole bracket has a base having a pole attachment portion to attach to a pole. The pole bracket also has a magnetic clip holder section coupled to the base. The magnetic clip holder section includes a snap stem portion operable to removably hold the magnetic cable fastener. The magnetic cable fastener includes a magnet, a boss attached to the magnet and a cable coupler attached to the boss. As the magnetic fastener is positioned as desired via the pole bracket, the magnetic fastener is magnetically self-aligned with and removably attached to the building structure.

Among other advantages, the pole bracket easily allows placement of the magnetic fastener to a high ceiling, beam, electrical box or in an otherwise inaccessible location. The magnetic fastener holds a cable such as wiring or conduit and quickly and easily magnetically attaches to a magnetic surface such as a building structure and electrical hardware such as electrical boxes. For example, a service person such as an electrician, builder, installer or even a home owner may simply attach the cable to the magnetic fastener and then using the pole bracket lift the cable and magnetic fastener to the building structure. The pole bracket permits a cable to be easily attached to the building structure even if on a high ceiling, inaccessible location or in blind engagement conditions. Thus, the service person does not have to climb up to a ceiling, building frame or truss to drill a hole to insert a fastener or to turn a screw or otherwise tighten a cable clamp. Thus, the pole bracket permits safe, easy and very fast attachment of a cable to the building structure. For example, a common electrician's pole of a suitable height can suitably attach a cable to a ceiling or building frame, without the need for a ladder, scaffold or lift. Wiring time and costs are thus significantly reduced. Further, the pole bracket may remove or move the magnetic fastener to another location quickly and inexpensively.

The pole bracket relatively easily facilitates attachment of various styles of magnetic fasteners, such that a single style pole bracket may be used with different size and style of poles and magnetic fasteners. The magnetic fastener permits attachment to a building structure having a variety of depth attachment requirements, sheet metal curvatures and/or thicknesses. For example, an electrical box, a frame, i-beam, chassis, or metal ceiling may have different sheet metal curvatures and thicknesses at various parts of the structure. Since the magnetic fastener adapts automatically to different attachment requirements, depths, sheet metal curvatures and thicknesses, the same style magnetic fastener clip may be used throughout the different applications thus eliminating the need for specific magnetic fastener clips for different parts of the structure that otherwise would require a clip, screw or clamp according to specific frame curvatures and thicknesses.

Attachment of the magnetic fastener onto the building structure is very easy and requires no turning, no clipping, no screwing and no or a relatively low level of insertion force compared to the extraction force, and as a result provides many ergonomic advantages. For example, the reduced amount of time and the relatively low level of insertion force is particularly advantageous for electricians who repetitively insert cable clamps onto a building structure. For example, since buildings, homes, factories, ware houses, and office buildings have extensive electrical wiring, wiring installation time and costs may be significantly reduced. The relatively low level of insertion force required for inserting the magnetic fastener into the building structure increases productivity and may result in fewer injuries to the electricians, including injuries related to repetitive stress syndrome. Further, by selecting a single magnetic fastener or reducing the number of different fasteners for different sheet metal curvatures and thicknesses, confusion during installation is eliminated since the same type or a reduced number of magnetic fasteners may be used for all or most body panel fasteners. Thus, an electrician need not worry about selecting the wrong fastener.

The magnetic cable fastener continuously adapts to changes in environmental conditions such as vehicle flexing, pushing by installers and electrician, vibration and thermal expansion. For example, the magnetic cable fastener may adapt to changes in thermal expansion, especially due to the differences in thermal expansion rates between dissimilar metals with respect to the building structure components and/or between plastic components such as the objects attached to the metal vehicle chassis. The magnetic cable fastener may also fasten to plastic engagement structures via a magnetic bracket. The pole bracket and magnetic fastener clip may be made of anti-corrosive material such as plastic or treated metal to provide long reliable service life.

Yet another advantage is that the magnetic cable fastener and pole bracket are relatively easy to manufacture using relatively inexpensive manufacturing processes and materials. The use of the magnetic cable fastener decreases production costs, increases worker productivity and efficiency, improves reliability and quality and decreases overall building warranty, vehicle assembly, warranty and maintenance costs. The pole bracket securely attaches a cable to the building structure, such that the pole bracket improves reliability both in the short term and in the long term, while further improving safety and quality.

FIG. 1 is an exploded view of a pole bracket 10, and assembly 20 according to one embodiment. The assembly 20 includes a pole 100, a pole fastener 102, and a magnetic cable fastener 60. Pole fastener 102 secures the pole 100 to the pole bracket 10 via hole 512. Although the pole fastener 102 shown is a screw, pole fastener 102 may be a nut, rivet, tapered fit, clip, twist tie, hook or any suitable fastener.

FIGS. 13 through 18 illustrates a pole bracket 10 according to one embodiment. The pole bracket 10 includes a base 30 and a magnetic clip holder section 40 coupled to the base 30. The magnetic clip holder section 40 includes a snap stem portion 50 operable to removably hold a magnetic cable fastener 60.

As is also shown in FIGS. 19-22, the magnetic cable fastener 60 includes a magnet 70, a boss 80 attached to the magnet 70; and a cable coupler 90 attached to the boss 80. The boss 80 attaches the magnet 70 via a magnet fastener 82. Magnet fastener 82 may be at least one of: a cap, a wedge, a weld, a prong, a nut, a rounded tip, a pointed tip, and/or a barb. The magnetic cable fastener 60 may be made of: at least one of: magnetic metal, stainless steel, aluminum, copper, plastic, fiber glass, copper, carbon fiber and a non magnetic material and/or any suitable material. The coupler 90 may include any attachment mechanism suitable to couple or attach to a cable such as pinch fingers, a nut, bolt, weld stud, thread stud, button head, clip, panel clip, retainer, panel mounted receptacle, retainer washer, or rivet, cable tie, wire clip, hook and loop fastener (Velcro®), sticky tape, double faced tape, spike array, or any suitable combination. The cable may be a cable, wire, rope, string, power line, power cable, shielded wire, computer line, rope, conduit, and/or pipe. The corresponding mounting structure thus would attach to the base attachment mechanism with a corresponding attachment mechanism.

FIG. 2 is a perspective view of the pole bracket 10 and assembly 20 according to one embodiment. A pole 100 may be removably inserted or affixed into the base 30. As is also best seen in FIGS. 13-18, the snap stem 50 further includes a key hole 110 to attach to a corresponding portion of the boss 80. For example, the key hole 110 attaches to a corresponding portion of the boss 80 has a common connection to allow for interchangeability between electricians poles and the magnetic cable fastener 60. The key hole 110 may have a flat, triangular, round, circular, semi circular, rectangular, curved shape and/or any suitable shape. The key hole 110 may have a retaining bump 120 formed on the key hole 110 to removably hold a corresponding section of the boss stem 84 of the magnetic cable fastener 60 until the magnetic cable fastener 60 magnetically fastens to a metal object. The boss stem 84 may have any suitable height, width and shape in such that the key hole 110 may removably hold the boss stem 84. The magnetic cable fastener 60 may be magnetically fastened into a building structure by removably positioning the magnetic cable fastener 60 into the building structure.

FIGS. 3 and 4 are assembly views of the pole bracket 10 and assembly 20 inserted into a pole 100 according to one embodiment. A magnetic cable fastener 60 is now ready to be positioned and attached to the building structure (not shown). The cable may be attached to the coupler 90 such that the magnetic cable fastener 60 is magnetically self-aligned and removably attached to the building structure.

FIGS. 13-18 illustrates the pole bracket 10 having three holes, 510, 512, 520 in the base 30 and an example of the snap stem 50 design although other designs are readily understood. According to one embodiment, the pole bracket 10 has a section having at least one bend angle between the snap stem 50 and the magnetic clip holder 40 to allow for either horizontal or vertical attachment of the magnetic cable fastener 10 with a magnetic object. For example, the pole bracket 10 shown has two bends to allow for horizontal attachment. However, the pole bracket 10 with only one bend (not shown) allows for vertical attachment. Other suitable number of bends, degree of bend and orientations for attachment are possible.

Referring again to FIGS. 19-22, and 26-27, the magnetic cable fastener 60 further includes a holder 120 attached to the magnet 70. Although not shown, optionally, an umbrella or foam 130 may be placed between the holder 120 and the boss 80 as is discussed in the referenced parent applications. The umbrella or foam 130 is attached to the holder 120 opposite the magnet 70. The magnet 70 may have a round, circular, semicircular, square, rectangular or curved shape, or any shape or configuration suitable to magnetically attach to the magnetic holder 120.

Figure 26:
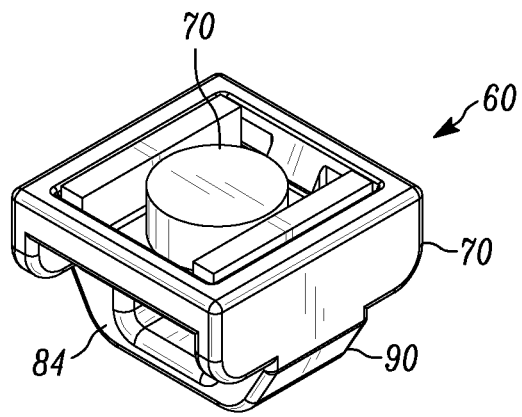
FIGS. 26 and 27 show two exemplary views of a magnetic cable fastener according to another embodiment.
Figure 27:
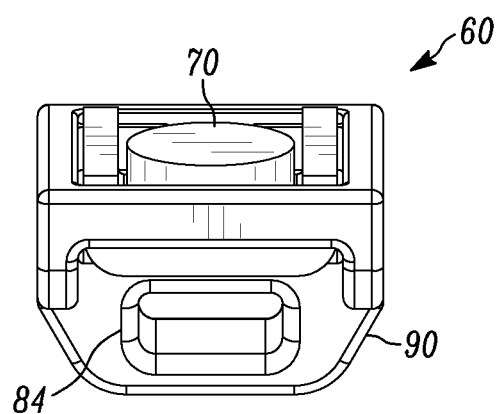
Figure 28:
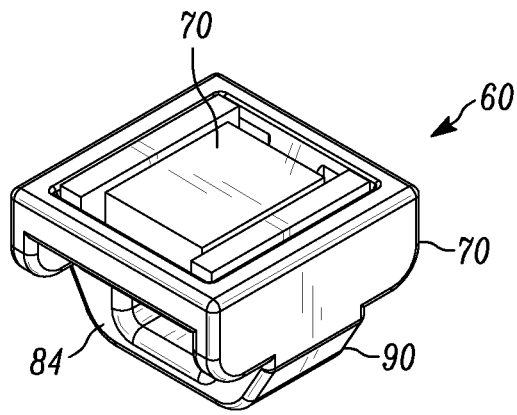
Figure 29:
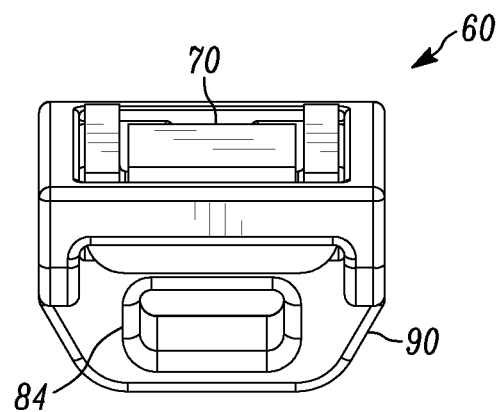

FIGS. 26 and 27 illustrate examples of a square shaped magnetic cable fastener 60, square shaped magnet 70 and a closed loop coupler 90. Although the cable coupler 90 shown in FIGS. 1-12 is a closed loop, the cable coupler 60 in the referenced co-pending application illustrate an open loop. According to one embodiment, the cable coupler 60 includes at least two fingers operable to releasably hold a cable.

As the magnetic cable fastener 60 nears the magnetic portion of the building structure, the magnetic force will automatically align and attach the magnetic cable fastener 60 with the structure making cable attachment very easy, and significantly faster than conventionally possible. Assembly of the magnetic cable fastener 60 onto the building structure is very fast and easy and requires no or a relatively low level of insertion force compared to the extraction force, and as a result provides many ergonomic advantages. As the magnetic cable fastener 60 is positioned near the building structure, the magnetic attraction will thus precisely align and firmly affix (snap) the cable and magnetic cable fastener 60 in proper position. Advantageously, the time consuming problem of drilling holes for an electrical bracket and/or moving magnetic cable fastener 60 blindly into slots in the building structure is eliminated since the magnetic cable fastener 60 substantially automatically self-aligns.

FIGS. 5-8 illustrates a pole bracket 10 and assembly 20 according to another embodiment. According to this embodiment, the pole bracket 10 is attached to the pole 100 via a nut 500. The pole bracket 10 base 30 has at least one opening 510, 512, 520 to attach to the pole 100. Although the openings 510, 512 are shown as round, the opening may have any suitable shape. The base 30 may include at least one of: a pole attachment, a threaded pole attachment with corresponding threads on a base hole (not shown), a nut welded to the base 30; a threaded pole 530 and nut attachment 500; a pole stabilizing tab 910; a tapered pole attachment 540, a screw 102, and a portion of the base 30 having a hole 510, 512, 520 to press fit a pole 100 and/or any suitable combination.

The pole bracket 30 may be made of at least one of: magnetic metal, steel, stainless steel, aluminum, copper, plastic, fiber glass, Polypropylene, glass, vinyl, rubber, acetal, polyacetal, polyoxymethylene, nylon, Acrylonitrile butadiene styrene (ABS), carbon fiber and/or a non magnetic material or any suitable material.

FIGS. 9-12 illustrate a pole bracket 10 and assembly 20 having an attachment mechanism according to another embodiment. According to this embodiment, the pole 100 is further secured to the attachment hole 520 via a snap fit connection on the pole bracket 30. According to one embodiment, prong 900 on pole 100 engages a hole 904 on tab 910 on bracket 30. Prong 900 swings into and removably engages tab 910 to stabilize pole bracket 10 during positioning and installation. For example, torque created by the weight of magnetic cable fastener 60 on the pole bracket 30 presses tab 910 onto prong 900. This stabilizes the assembly 20 sufficient to allow positioning of the magnetic cable fastener 60 as desired. Once magnetic cable fastener 60 is attached to the building structure, the pole bracket 10 may be detached from the pole 100 when prong 900 swings away from tab 910.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A pole bracket for magnetically attaching a magnetic cable fastener, the pole bracket comprising:
   a base attached to a pole;
   a magnetic clip holder section coupled to the base, the magnetic clip holder section comprising:
   a snap stem portion removably holding a magnetic cable fastener,
   the magnetic cable fastener comprising:
   a magnet;
   a boss attached to the magnet;
   a boss comprising a boss stem portion; and
   a cable coupler attached to the boss.
   wherein the snap stem further includes a key hole comprising a channel with an internal annular portion and an open distal end, wherein the channel further comprises opposing retaining bumps protruding inward from opposing sides of said channel in a plane of the key hole to form a connecting portion to removably hold the boss stem.

2. The pole bracket of claim 1 wherein the pole bracket is made of at least one of: magnetic metal, stainless steel, aluminum, copper, plastic, fiber glass, Polypropylene, glass, vinyl, rubber, acetal, polyacetal, polyoxymethylene, nylon, Acrylonitrile butadiene styrene (ABS), carbon fiber and a non magnetic material.

3. The pole bracket of claim 1 further comprising a section having at least one bend angle between the snap stem and the magnetic clip holder to allow for either horizontal or vertical attachment of the magnetic cable fastener with a magnetic object.

4. The magnetic bracket of claim 1 wherein the pole further includes a prong to releasibly engage a tab on pole bracket to stabilize the pole and pole bracket.

5. The pole bracket clip of claim 1 wherein the base includes at least one of: a pole attachment, a circular hole, a threaded pole attachment with corresponding threads on a base hole; a threaded pole and nut attachment; a pole stabilizing tab; a tapered pole attachment; and a portion of the base having a hole to press fit a pole.

6. The pole bracket clip of claim 1 wherein the cable coupler further includes at least two fingers operable to releasably hold a cable.

7. The pole bracket clip of claim 1 wherein the cable coupler further includes a closed loop operable to hold a cable.

8. The pole bracket clip of claim 1 wherein the boss attaches the magnet via at least one of: a cap, a wedge, a weld, a prong, a nut, a rounded tip, a pointed tip, and a barb.

* * * * *